United States Patent [19]
Brown et al.

[11] Patent Number: 5,734,150
[45] Date of Patent: Mar. 31, 1998

[54] ELECTRONIC FUNDS ACCEPTOR FOR VENDING MACHINES

[75] Inventors: Allan M. Brown, St. Hubert, Canada; Denis Laniel, 337 rue Seguin, St-Colomban, Quebec, Canada, J0R 1N0; James Anglehart, Montreal, Canada

[73] Assignee: Denis Laniel, St-Colomban, Canada

[21] Appl. No.: 543,718

[22] Filed: Oct. 16, 1995

[51] Int. Cl.⁶ .............................. G06F 7/08; G06F 11/60; G06K 5/00
[52] U.S. Cl. ..................... 235/381; 235/380; 235/385
[58] Field of Search ........................ 235/381, 380, 235/492, 385

[56] References Cited

U.S. PATENT DOCUMENTS

| | | | |
|---|---|---|---|
| 4,611,205 | 9/1986 | Eglise | 364/465 |
| 4,669,596 | 6/1987 | Capers et al. | 235/381 |
| 4,812,632 | 3/1989 | Kakinuma et al. | 235/281 |
| 4,814,592 | 3/1989 | Bradt et al. | 235/381 |
| 4,879,607 | 11/1989 | Redemacher | 235/281 |
| 4,945,217 | 7/1990 | Bolan | 235/492 |
| 5,107,099 | 4/1992 | Smith | 235/281 |
| 5,147,021 | 9/1992 | Marayama et al. | 235/381 |
| 5,192,855 | 3/1993 | Insulander et al. | 235/281 |
| 5,303,844 | 4/1994 | Muehlberger | 235/381 |
| 5,310,035 | 5/1994 | Dobransky, Jr. et al. | 235/281 |
| 5,311,003 | 5/1994 | Saroya | 235/281 |
| 5,336,870 | 8/1994 | Hughes et al. | 235/281 |
| 5,343,026 | 8/1994 | Tanaka | 235/281 |
| 5,362,951 | 11/1994 | Kanazawa et al. | 235/281 |
| 5,386,106 | 1/1995 | Kumar | 235/281 |
| 5,409,092 | 4/1995 | Itako et al. | 235/381 |
| 5,440,108 | 8/1995 | Tran et al. | 235/381 |
| 5,445,295 | 8/1995 | Brown | 235/381 |
| 5,450,938 | 9/1995 | Rademacher | 235/281 |
| 5,489,014 | 2/1996 | Menoud | 235/381 |
| 5,520,275 | 5/1996 | Foglino | 235/381 |

*Primary Examiner*—Donald T. Hajec
*Assistant Examiner*—Douglas X. Rodriguez
*Attorney, Agent, or Firm*—Swabey Ogilvy Renault

[57] ABSTRACT

The electronic funds acceptor has a memory for storing the maximum value of a vending machine product to reduce the number of coin or bill received signals to be generated and sent to the electronics in the vending machine which authorize purchase of goods from the vending machine. The acceptor also has a memory for recording incomplete transaction records so that a purchase transaction can be completed later in the case that the user removes the medium from the vending machine once the transaction is in progress. The acceptor also has a memory for storing the total amount of goods purchased using electronic funds so that the total purchase amount from all vending machines can be compared to the total amount of funds loaded onto the electronic funds recording medium to check for fraud or abuse of the system. As a further measure of security, the acceptor has a memory for storing an incrementable use marker in association with each identification number of all electronic funds data recording media which carry a copy of the use marker. If the use marker is determined by the acceptor to precede the marker recorded in memory in the acceptor, the transaction is prevented since the given medium would necessarily be a copy. The vending machine using the funds acceptor has a product price memory for determining a product price as a function of time of day and the recording medium identification number.

30 Claims, 1 Drawing Sheet

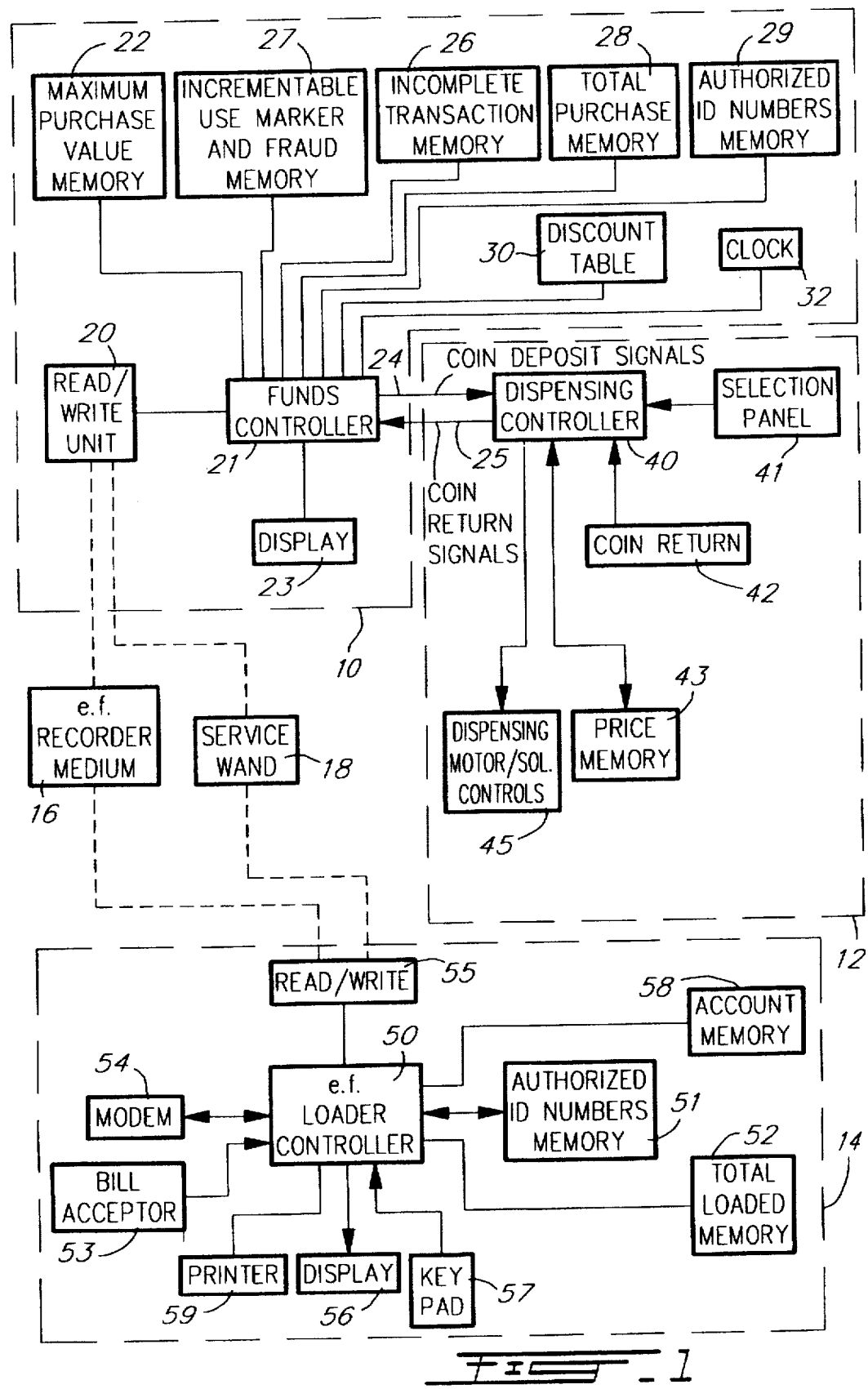

ELECTRONIC FUNDS ACCEPTOR FOR
VENDING MACHINES

TECHNICAL FIELD

The present invention relates to an electronic funds acceptor for use with a vending machine as well as a vending machine and a vending machine system incorporating an electronic funds acceptor.

BACKGROUND OF THE INVENTION

The traditional vending machine has three basic components in the vending control system. The first component accepts coins or bills. The coin or bill acceptor mechanism identifies the coins or bills, carrying out some form of verification, and generates an electrical output signal to say that a particular type of coin or bill has been received. The second component maintains a running total of the amount of money received. The third component accepts a purchaser's command for purchasing an item and determines if the total amount of money received is sufficient to purchase the item selected. This third component then activates the dispensing mechanism to dispense the item selected and returns any surplus money as change by sending change signals to the coin accepting mechanism. The first component is typically a coin acceptor mechanism, as is manufactured and sold under the trade names of COINCO AND MARS. Such coin acceptor mechanisms also operate to return change, if required, after a purchase. The second and third components of the control system as set out above may be integrated into a single electronic control system, however, it is also known for the circuitry producing a total of the amount of money received in the coin acceptor mechanism to be integrated with the coin acceptor mechanism.

Electronic funds in the form of a portable electronic funds data recording medium, such as a magnetic striped card or smart card have been used to provide a source of money in vending machines, and in particular, in public telephones. Although a variety of systems exist, the most popular system involves purchasing a magnetic card or a smart card at a retail outlet with a set amount (e.g. $10 or $20) loaded on the portable electronic funds data recording medium. Each time the recording medium is used to make a purchase or for paying for a telephone call, the vending machine or telephone subtracts the amount of money consumed from the amount of money available on the recording medium, and it is ensured that the correct updated amount is recorded on the recording medium before the user leaves the vending machine or telephone.

In the known prior art systems, the vending machine is either given all of the electronic funds available on the recording medium with authorization to debit those funds for a transaction before returning the balance to the recording medium, or the amount of the purchase is transmitted to the electronic funds acceptor apparatus for removal from the portable electronic funds data recording medium. It has been found that such systems are not easily compatible with vending machines having a certain type of electronic dispensing control circuit. Thus, the prior art electronic funds acceptor systems do not easily replace existing coin mechanisms which merely produce signals indicating that a valid coin or bill has been accepted and which do not produce a sum signal of a total of an amount of money received.

Also, the known prior art systems require the recording medium to be read for authorizing a purchase transaction and then to be written to for updating a balance of funds on the medium. If the recording medium is removed from the vending machine before the updated balance is written, the transaction may need to be canceled or the balance of funds on the medium may be inaccurate.

When the electronic funds recording medium is relatively inexpensive, such as a magnetic stripe card or a memory card such as a Dallas Semiconductor "button" key, the funds stored may be vulnerable to fraud or tampering using commercially available read-write devices. In the known prior art, no fraud control is provided when using magnetic or electronic memory as the electronic funds recording medium, except for the data coding formats used to store the data on the media.

In the art of vending machines, prices for coffee, snacks and other food are fixed. No control over consumption is offered by varying prices by time of day or day of the week.

U.S. Pat. No. 4,669,596 to Capers et al describes a typical prior art vending machine accessory allowing for a coded card to be used as the portable electronic funds data recording medium, in which the accessory reads the credit value coded on the card, compares the same with the price of the item selected, actuates the item dispenser, deducts the price of the item dispensed from the amount originally coded on the card, and encodes a new value on the card as it is withdrawn.

U.S. Pat. No. 5,450,938 to Rademacher describes bank vending machines having an associated debit card reader or vend card reader in which the card reader controller interfaces between the money handling mechanism of one or more of the vending machines and the vending machine controller circuitry.

SUMMARY OF THE INVENTION

It is an object of the present invention to provide an improved electronic funds acceptor for use with a vending machine, as well as an improved vending machine, which overcome the drawbacks of the known prior art.

According to a first aspect of the present invention, there is provided an electronic funds acceptor for use with a vending machine of the type having electronic means for receiving at least one coin or bill accepted signal and for producing a total of an amount of money received based on the at least one coin or bill accepted signal, means for activating a dispensing mechanism after verification that the total amount is sufficient for purchasing a product to be dispensed, and means for generating at least one change return signal for dispensing change, the acceptor comprising: an electronic reader for reading and writing data to a portable electronic funds data recording medium; memory means for storing a predetermined maximum value of a product to be purchased from the vending machine; means for reading a monetary amount from the medium; means for subtracting a lesser amount of the monetary amount and the maximum value from the monetary value to produce a new balance, the lesser amount being recorded; means for generating a number of the at least one coin or bill received signals to transfer the lesser amount from the acceptor to the electronic means of the vending machine; means for counting any of the at least one change return signals received from the electronic means of the vending machine to produce a change count; means for incrementing the new balance by the change count; and means for recording the new balance on the medium as the monetary amount. In this way, the number of the at least one coin or bill received signals to be generated by the acceptor and the number of the at least one change return signals to be generated by the vending machine and counted by the acceptor are reduced by limiting the lesser amount to the predetermined maximum value, thereby increasing a speed of transaction.

According to a second aspect of the present invention, there is provided an electronic funds acceptor for use with a vending machine, comprising: an electronic reader for reading and writing data to a portable electronic funds data recording medium; a memory for storing incomplete transaction records including an identification number for a predetermined medium and associated electronic funds data; means for reading and storing an identification number from the medium; means for determining whether the identification number read matches an identification number of the records; and means for updating a monetary amount of electronic funds held by the medium based on the associated data and for updating the records, if a match of the identification number is determined. In this way, when one of the portable electronic funds data recording mediums is removed from the reader before completing a transaction, the acceptor can update the monetary amount at a later time while being able to handle further purchase transactions using different electronic funds recording mediums in the interim.

According to a third aspect of the present invention, there is provided an electronic funds acceptor system for use with at least one vending machine, comprising: at least one electronic reader associated with the vending machine for reading and writing data to a portable electronic funds data recording medium; means for controlling a purchase transaction using funds stored on the medium, and for maintaining a count of total product purchased; loader means for transferring electronic funds to the medium and for storing a count of total funds transferred to the medium; and means for comparing the total product purchased count with the total funds transferred count to generate a warning signal if the medium has been used to purchase more than has been transferred to it. This aspect of the invention provides for a measure of fraud control. Preferably, the total product purchased count and the total funds transferred count are stored for each individual recording medium using the system. Thus the fraud control is on an individual basis, and the warning signal will indicate a particular user. Such a user may be "locked out" of the system by subsequently removing the associated identification number from the list of authorized users.

As an additional measure of security and fraud control, a fourth aspect of the present invention provides an electronic funds acceptor for use with a vending machine comprising: an electronic reader for reading and writing data to a portable electronic funds data recording medium; a memory for storing an identification number for each the medium used with the acceptor and an associated incrementable use marker; means for reading and storing an identification number and the marker from the medium; means for determining whether the marker read from the medium follows the marker stored in the memory whereupon a pass signal is generated; means for controlling a purchase transaction using funds stored on the medium; means for signaling a fraudulent medium and preventing use of the medium in absence of the pass signal; and means for updating the marker in the memory and on the medium. In this way, if data on the medium is copied onto another medium, the other medium will be detected as being fraudulent by the acceptor if it is used for a transaction after the medium from which the other medium is copied is used to carry out a transaction using the acceptor.

According to a fifth aspect of the present invention, there is provided a vending machine comprising: a funds acceptor for receiving funds and producing an amount signal; product dispensing means for controllably dispensing product in response to a product dispense signal; product select means for receiving a user command to dispense product, obtaining from a product price memory a value of a product selected by the user, confirming that the amount of funds is sufficient to purchase the product selected and generating the dispense signal to dispense the product selected in the case of sufficient funds; and timer control means for adjusting the contents of the product price memory as a function of time of day. In this way, the product to be purchased from the vending machine may be made less expensive at certain times of day to encourage consumption, while prices may be increased at other times to either discourage consumption or increase profit.

According to a sixth aspect of the present invention, there is provided a vending machine system comprising: an electronic funds acceptor system for use with at least one vending machine, comprising: a plurality of portable electronic funds data recording mediums each containing an identification number; an electronic reader associated with the at least one vending machine for reading data from the recording medium; means for controlling a purchase transaction using the medium and for maintaining a count of total product purchase in a memory record for each of the mediums including the identification number; means for transferring the count of total product purchase for the mediums identified by the identification number from the at least one vending machine to an accounting computer; and the accounting computer comprising means for determining a total amount of product purchased from the at least one vending machine using each of the recording mediums identified by the identification number since the time of last billing to produce a billing amount for each of the recording mediums.

BRIEF DESCRIPTION OF THE DRAWINGS

The invention will be better understood by way of the following detailed description of a preferred embodiment with reference to the drawing appending hereto, in which:

FIG. 1 is a schematic block diagram of a vending machine system incorporating the preferred embodiment.

DETAILED DESCRIPTION OF THE PREFERRED EMBODIMENT

In FIG. 1, reference numeral 10 generally designates the electronic funds acceptor for use with a vending machine. The vending machine has electronic means generally indicated by reference numeral 12 for controlling dispensing of goods purchase. Electronic funds originate from an electronic funds loader system generally indicated by reference numeral 14. The electronic funds are loaded onto electronic funds recording medium 16 which in the case of the preferred embodiment is a touch memory device, also known as a button, manufactured by Dallas Semi-conductor. The recording medium 16 as is known in the art comprises a serial data interface circuit along with non-volatile memory including a read only identification number. Like a conventional watch battery, a central circular surface provides one electrical contact while the circumferential surface provides the other electrical contact for connecting the serial data interface of the touch memories 16 to a reader. Once electric funds are loaded on medium 16, medium 16 may be used with one of a plurality of acceptors 10 for purchasing goods with electronic funds. In the preferred embodiment, transfer of data from acceptor 10 to loader 14 is achieved using a service wand 18 which is similar in architecture to medium 16 except that it has an expanded memory and is programmable to upload and download data for transfer between acceptor 10 and loader 14. The service wand 18 is taken around from one acceptor 10 to the other as service personal goes around to service the vending machines. After servicing the machines, the service wand is brought to loader 14 so that data about the use of machines 10 is passed onto loader 14. It would of course be possible to provide a data link directly between acceptor 10 and loader 14, however, in the preferred embodiment it is preferred to reduce installation overhead and provide for data transfer through the service wand 18.

Acceptor 10 comprises the corresponding Dallas semiconductor read write unit 20. Unit 20 physically connects to medium 16 or service wand 18 for the reading and writing of data. A funds controller circuit 21 which may comprise suitably programmed microprocessor, is at the heart of acceptor 10. A non-volatile or battery backup memory is connected to controller 21 and comprises memories 22, 26, 27, 28 and 29. The contents and purpose of these memories will be set out in detail hereinbelow. The controller 21 is connected to a display 23 which is preferably a two line forty-character LCD display integrated on a front panel of acceptor 10. In the preferred embodiment, acceptor 10 is a replacement unit for a standard MARS or COINCO coin acceptor mechanism of the type which produces a coin received signal for each type of coin inserted and which is capable of dispensing return coins upon receiving individual coin return signals. Thus, the controller 21 has an output bus 24 of coin deposit signals and an input bus 25 of coin return signals. Buses 24 and 25 are connected to a dispensing controller 40 of the vending machine electronics 12.

The vending machine electronics 12 comprise a dispensing controller 40 which receives from the funds controller 21 the coin deposit signals on bus 24 and to which it outputs the coin return signals on bus 25. A user selection panel 41 provides selection input to controller 40. A coin return or canceled transaction button is provided at 42 and is connected to controller 40. A price memory 43 is provided and the price memory 43 may have its values updated as a function of time by the timer control means 44. The output of the dispensing controller 40 for controlling dispensing of goods is to the dispensing motor and/or solenoid control circuit 45 which is used for activating the appropriate dispensing motors or solenoids for controlling the release of product or the dispensing of liquids.

The loader system 14 has a controller 50 connected to a read/write unit 55 similar to unit 20. In the preferred embodiment, a memory 51 of authorized identification numbers for the recording media 16 authorize to use the system is provided along with a memory 52 for recording the total amount of electronic funds loaded onto each authorized recording medium 16 in the system. The source of the electronic funds may be from a bill acceptor 53 or the electronic funds may be delivered by means of a secure electronic funds transfer via a modem 54 as is known in the art. Alternatively, especially coated service wand 18 or electronic funds recording medium 16 may be provided and coupled to read/write unit 55 for receiving the electronic funds through the same. The user of the loader system 14 is provided with messages on display 56 while input commands to control the system 14 are entered through key pad 57.

Having described the general structure of the preferred embodiment, the operation of the invention has a replacement to a mechanical coin acceptor mechanism will now be described. The memory 22 stores a predetermined maximum value of a product to be purchased from the vending machine. In the case of a vending machine which dispenses a plurality of products at different prices, this is the value of the most expensive item. When a customer or user inserts the recording medium 16 into the read/write unit 20, the funds controller 21 reads from medium 16 an identity of the medium 16 which is a 32 bit identification serial number stored in non-volatile read only memory within medium 16, along with a balance value of electronic funds stored on medium 16. As will be described in greater detail hereinbelow, the balance value according to the preferred embodiment is stored in an encrypted form along with an incrementable use marker for the purposes of improving security. The funds controller 21 then determines whether the balance of electronic funds available on recording medium 16 exceeds the maximum purchase value in memory 22. In the case that it does, the funds controller 21 overwrites the amount of electronic funds on the recording medium with a new balance equivalent to the previous balance less the maximum purchase value. The funds controller 21 then outputs in a serial fashion coin deposit signal pulses on the appropriate lines of bus 24 in order to signal to controller 40 that the maximum purchase value has been received. The exact nature of which coin signals are to be generated may be predetermined and stored in memory 22 to improve the speed of the transaction, and for that matter the maximum purchase value may be determined to be a value such as two dollars which exceeds by a small amount the actual maximum purchase value of products contained within the vending machine in order to reduce the number of coin deposit signals to be serially generated, such as in the example to single one dollar pulses. When the predetermined maximum amount of funds has been transferred over to the dispensing controller 40, the user selection at panel 41 will cause the dispensing controller 40 to check the price in prince memory 43 of the selected item, cause the dispensing motor and/or solenoid control circuits 45 to activate the appropriate dispensation, and then return any change by pulsing coin return signals on line 25. Funds controller 21 then adds up the coin return signals generated and then proceeds to read the balance from recording medium 16 at the return change to that amount and then overwrite the balance on recording medium 16.

If the user removed the recording medium 16 from the read/write unit 20 during the selection without giving the funds controller 21 a chance to properly return the change, an incomplete transaction is recorded in memory 26. Furthermore, before returning any change to recording medium 16, a check is made that the ID number of the recording medium connected to the read write/unit 20 is indeed the same as the ID number of the recording medium whose electronic funds are being used for the current purchase transaction. In the incomplete transaction memory 26, a list of ID numbers and amount of change to be returned is set up. When it is determined that change cannot be returned to a particular recording medium, the controller 21 searches through the list in memory 26 to determine whether that particular recording medium as identified by its identification number already has a record in existence. If so, the amount of change to be returned for the present transaction is added to the amount of money owing. Each time a new recording medium 16 is connected to read write unit 20, the funds controller 21 reads the identification number from recording medium 16 and checks to see whether any incomplete transaction exits for that particular recording medium and would proceed to add to its balance of electronic funds any amount owed to that recording medium and then delete the incomplete transaction record for that particular recording medium as identified by its identification number.

According to the third and fourth aspects of the invention, means for detecting fraud are provided. In the case that an exact copy of an electronic funds recording medium 16 is made, the invention provides means to detect that a duplicate medium 16 is in use. The recording medium 16 contains a read-only identification number, a balance amount and optionally, an additional incrementable use marker. The incrementable use marker and fraud memory 27 of each acceptor 10 is used to store in association with each authorized ID number a counter value which is incremented with each use of medium 16. The marker may comprise a digital value which is incremented by one with each use or transaction, or it may comprise a time clock reading, or a sequence value from a pseudo random number generator sequence. In the case of the counter, the counter value contained in memory 27 which is associated with the identification number read from medium 16 is compared with the counter value read from medium 16, and if it is found that the use counter in medium 16 is less than the use counter in memory 27, then a fraud flag is set and the present transaction as well as future transactions using the particular recording medium is denied. In the case that a time clock value is used as the marker, the time clock value in memory 27 is compared to the time clock value of the last transaction recorded in medium 16 to confirm that the value in medium 16 follows the value in memory 27. In the case of a pseudo random number generator marker, the markers in memory 27 and recorded on medium 16 are processed by the random number generator function to generate the next value in the sequence iteratively until it is determined that the next sequence value generated matches either one of the initial marker values. If the marker value recorded on medium 16 yields the marker value contained in memory 27 before the marker value contained in memory 27 yields the value contained on medium 16, a fraudulent medium 16 is detected. When it is determined that the medium 16 is not a fraudulent copy, the use marker from medium 16 is incremented or otherwise updated by controller 21 and the new value is recorded onto medium 16 and into memory 27 in association with the identification number for the particular medium 16. As can be appreciated, in the case the encryption is used to encrypt the data recorded on medium 16, the inclusion of the use marker which is continuously and possibly randomly changing can render a breaking of the encryption key much more difficult.

According to the fifth aspect of the invention, the funds controller 21 is provided with a discount table memory 30 as well as a time clock 32. The funds controller 21 may vary the price of a selected product as a function of time of day or the identification number on the recording medium. In this way, the amount of money collected for a product purchased may vary according to the time of day for certain individuals and even for certain items. For example, if the vending machine is selling coffee, an employer may wish to encourage employees to arrive on time and have a coffee before the start of the working day. Coffee for regular employees may be free from the coffee vending machine if consumed before 8:00 a.m. Coffee which is consumed during coffee breaks and lunch hour may be at a set low price. For regular staff, coffee consumed during working hours may be charged at a premium. For managers and executives, coffee may be made available at a set fixed price during the day and then at a reduced price after 5:30 p.m. Likewise, snacks from a vending machine may be offered at a reduced price to those working late. The discount table 30 in the case of a coffee vending machine may establish the percentage reduction in the purchase for users identified by identification numbers. When the funds controller determines that an individual requesting a purchase is entitled to a discount, the funds controller 21 carries out the financial transaction with respect to the vending machine controller 12 in the usual manner and the amount of money debited from recording medium 16 is reduced by the percentage discount. For example, if the normal maximum purchase value in memory 22 is $1.00 in the case of a coffee machine, a 50% discount would result in the funds controller 21 transferring $1.00 nonetheless to dispensing controller 40 over line 24 with $0.50 being removed from the balance in recording medium 16. When change is returned from controller 40 as in the case of a purchase of a $0.75 regular coffee, the $0.25 change is only returned in half to recording medium 16. If recording medium 16 was removed before the change could be returned, the incomplete transaction record in memory 26 would indicate that there is 12 or 12.5 cents of change owed to that particular recording medium 16. Of course, if the discount was 100%, no funds would be debited from recording medium 16 and any change would be kept by funds controller 21. In the case that the discount table 30 is used, the total purchase memory 28 may keep account of both the total amount debited from each user's account and the total amount given to dispensing controller 40 on behalf of each user's account in order to maintain an accurate count of consumption irrespective of discounts. The discount table 30 may also be configured with a data field for at least some users, such as all blue collar workers, which permit them a single discounted purchase during particular time periods after which a different discount rate, if any, applies. For example, the first coffee of the day if consumed before 8:00 a.m. would be discounted 100%, whereas subsequent coffee purchases during break times and before 8:00 a.m. would be at a regular 50% discount.

According to the sixth aspect of the present invention, the vending machine system does not need to refuse access to those recording mediums 16 whose balance has reached zero, since all authorized ID numbers contained within memory 29 would be entitled to consume without the requirement for restrictions. Instead of loading funds onto medium 16 from loader 14, the total purchase memory 28 in the preferred embodiment is downloaded into service wand 18 from each of the controllers 10 and subsequently transferred to the loader 14 which acts as an accounting computer. For each authorized recording medium, the total of product purchased from all vending machines in the system is calculated and the account for each user of the system is prepared. For example, apparatus 14 may be kept by the accounting or payroll department of a company or institution and the vending machine system total consumption for each regular period is prepared and charged to individual employees. The employees may pay directly to their accounting department, or the amount of consumption may be deducted from their pay cheques. As can be appreciated, the amount in the total purchase memory 28 may be unique to consumption at the particular vending machine or it may be a copy of the total purchase running balance recorded in medium 16. In the latter case, a certain degree of security can be ensured by detecting a fraudulent recording medium 16 if the value in memory 28 is higher than the value on medium 16. In the sixth aspect of the present invention, it is possible to provided a recording medium 16 which is read-only and contains only an identification number. While this option may simplify the structure of the recording medium 16, it provides as the only means of security control over the authorized ID numbers stored in memory 29. Since the billing period may be as long as monthly, detection of a fraudulent recording medium may only be detected after a particular user notices an unusually high balance on his statement or bill. Preferably, the sixth aspect of the present invention is used in combination with the incrementable use marker and fraud memory 27 for the purposes of improved security control. While the service wand may simply download the values from the total purchase memory 28 for transfer to the accounting computer 14, it would also be possible for the funds controller 21 to reset the value in the total purchase memory 28 once the value has been transferred to the wand 18.

As can be appreciated, the service wand 18 is only allowed access to the memory contents of the acceptor 10 by the funds controller 21 upon the confirmation that the service wand is authentic in order to prevent a fraudulent impostor from reprogramming the funds controller 21 using a fraudulent service wand 18 to permit a fraudulent recording medium 16 from using the acceptor 10 without detection.

Although the invention has been described above for the purposes of illustration with reference to a specific preferred embodiment, it is to be understood that the scope of the invention is defined by the appended claims.

What is claimed is:

1. An electronic funds acceptor for use with a vending machine, comprising:

an electronic reader for reading and writing data to a portable electronic funds data recording medium;

a memory for storing incomplete transaction records including an identification number for a predetermined said medium and associated electronic funds data;

means for reading and storing an identification number from said medium;

means for determining whether said identification number read matches an identification number of said records; and means for updating a monetary amount of electronic funds held by said medium based on said associated data and for updating said records, if a match of said identification number is determined, whereby when one of said portable electronic funds data recording mediums is removed from said reader before completing a transaction, said acceptor can update said monetary amount at a later time while being able to handle further purchase transactions using different said mediums in the interim.

2. The electronic funds acceptor as claimed in claim 1, wherein said acceptor for use with a vending machine of the type having electronic means for receiving at least one coin or bill accepted signal and for producing a total of an amount of money received based on said at least one coin or bill accepted signal, means for activating a dispensing mechanism after verification that said total amount is sufficient for purchasing a product to be dispensed, and means for generating at least one change return signal for dispensing change, said acceptor further comprising:

memory means for storing a predetermined maximum value of a product to be purchased from said vending machine;

means for reading a monetary amount from said medium;

means for subtracting a lesser amount of said monetary amount and said maximum value from said monetary value to produce a new balance, said lesser amount being recorded;

means for generating a number of said at least one coin or bill received signals to transfer said lesser amount from said acceptor to said electronic means of said vending machine;

means for counting any said at least one change return signals received from said electronic means of said vending machine to produce a change count;

means for incrementing said new balance by said change count; and means for recording said new balance on said medium as said monetary amount, whereby the number of said at least one coin or bill received signals to be generated by said acceptor and the number of said at least one change return signals to be generated by said vending machine and counted by said acceptor are reduced by limiting said lesser amount to said predetermined maximum value, thereby increasing a speed of transaction.

3. The acceptor as claimed in claim 2, further comprising a display for displaying instruction messages and said monetary amount.

4. The acceptor as claimed in claim 2, wherein said medium comprises a touch memory device.

5. The acceptor as claimed in claim 2, further comprising means for changing said maximum amount including means for recognizing a predetermined program mode code on said medium being read and obtaining a new said maximum amount from said medium having said code recorded thereon.

6. The acceptor as claimed in claim 2, wherein said means for reading a monetary amount from said medium also reads an identification number unique to said medium, said memory means further containing a list of authorized identification numbers, and said acceptor denies operation of said vending machine to said medium if said identification number is not on said list.

7. The acceptor as claimed in claim 6, wherein said medium comprises a touch memory device including a read-only identification number.

8. The acceptor as claimed in claim 1, further comprising a display for displaying instruction messages and said monetary amount.

9. The acceptor as claimed in claim 1, wherein said medium comprises a touch memory device including a read-only identification number.

10. The acceptor as claimed in claim 1, wherein said associated electronic funds data comprise a change return amount to be added to said monetary amount held by said medium.

11. The acceptor as claimed in claim 1, wherein said associated electronic funds data comprise a purchase amount to be subtracted from a pre-purchase monetary amount to be recorded on said medium as said monetary amount held by said medium.

12. The acceptor as claimed in claim 11, further comprising means for detecting an incomplete transaction flag recorded on said medium when said identification number is not determined to match, and indicator means for indicating upon such presence of said flag to a user of said medium that said medium must complete an earlier transaction at a different vending machine before being able to proceed to a new purchase.

13. The acceptor as claimed in claim 10, further comprising means for detecting an incomplete change return flag recorded on said medium when said identification number is not determined to match, and indicator means for indicating upon such presence of said flag to a user of said medium that money back is due to said medium at a different vending machine.

14. The acceptor as claimed in claim 12, wherein said indicator means identifies said different vending machine, and said flag contains identification information for said different vending machine.

15. The acceptor as claimed in claim 13, wherein said indicator means identifies said different vending machine, and said flag contains identification information for said different vending machine.

16. An electronic funds acceptor system for use with at least one vending machine, comprising:
- at least one electronic reader associated with said vending machine for reading and writing data to a portable electronic funds data recording medium;
- means for controlling a purchase transaction using funds stored on said medium, and for maintaining a count of total product purchased;
- loader means for transferring electronic funds to said medium and for storing a count of total funds transferred to said medium; and
- means for comparing said total product purchased count with said total funds transferred count to generate a warning signal if said medium has been used to purchase more than has been transferred to it, wherein said means for controlling a purchase transaction comprises:
  - a memory for storing incomplete transaction records including an identification number for a predetermined said medium and associated electronic funds data;
  - means for reading and storing an identification number from said medium;
  - means for determining whether said identification number read matches an identification number of said records; and
  - means for updating a monetary amount of electronic funds held by said medium based on said associated data and for updating said records, if a match of said identification number is determined, whereby when one of said portable electronic funds data recording mediums is removed from said reader before completing a transaction, said acceptor can update said monetary amount at a later time while being able to handle further purchase transactions using different said mediums in the interim.

17. The acceptor system as claimed in claim 16, wherein said count of total product purchased using said medium is maintained in a memory record for each said medium including said identification number, said loader means store said count of total funds transferred to said medium for each said medium identified by said identification number, and said means for comparing determine if any particular said medium identified by said identification number has been used to purchase more than has been transferred to it.

18. The acceptor as claimed in claim 17, wherein said medium comprises a touch memory device including a read-only identification number.

19. The acceptor as claimed in claim 17, wherein said means for reading said identification number includes a list of authorized identification numbers, and said means for controlling a purchase transaction denies operation of said vending machine to said medium if said identification number is not on said list.

20. The acceptor as claimed in claim 17, wherein said means for comparing includes a portable wand device for downloading all said memory records for each said identification number from said at least one vending machine.

21. The electronic funds acceptor as claimed in claim 1, wherein said acceptor is for use with a vending machine,
- said memory stores an associated incrementable use marker,
- said means for reading and storing an identification number also read and store said marker from said medium,
- said acceptor further comprising:
  - means for determining whether said marker read from said medium follows said marker stored in said memory whereupon a pass signal is generated;
  - means for controlling a purchase transaction using said medium;
  - means for signaling a fraudulent said medium and preventing use of said medium in absence of said pass signal; and
  - means for updating said marker in said memory and on said medium, whereby if data on said medium is copied onto another said medium, said other medium will be detected as being fraudulent by said acceptor if it is used for a transaction after said medium from which said other medium is copied is used to carry out a transaction using said acceptor.

22. The acceptor as claimed in claim 21, wherein said marker is a transaction count and total purchase count.

23. The acceptor as claimed in claim 21, wherein said marker is a time stamp.

24. The acceptor as claimed in claim 21, wherein said memory means further contains a list of authorized identification numbers, said acceptor denying operation of said vending machine to said medium if said identification number is not on said list, said means for signaling a fraud removing said identification number read from said list upon failure to detect said pass signal.

25. A vending machine comprising:
- a funds acceptor for receiving a user identification number and funds, and for producing an amount signal;
- a time clock;
- product dispensing means for controllably dispensing product in response to a product dispense signal;
- product select means for receiving a user command to dispense product, obtaining from a product price memory a value of a product selected by said user, confirming that said amount of funds is sufficient to purchase said product selected and generating said dispense signal to dispense said product selected in the case of sufficient funds; and
- timer control means for adjusting the contents of said memory as a function of time of day and said identification number, whereby said product to be purchased from said vending machine may be made less expensive at certain times of day to encourage consumption in the case of certain users, while prices may be increased at other times to either discourage consumption or increase profit, wherein said funds acceptor comprises:
  - an electronic reader for reading and writing data to a portable electronic funds data recording medium;
  - a memory for storing incomplete transaction records including an identification number for a predetermined said medium and associated electronic funds data;
  - means for reading and storing an identification number from said medium;
  - means for determining whether said identification number read matches an identification number of said records; and means for updating a monetary amount of electronic funds held by said medium based on said associated data and for updating said records, if a match of said identification number is determined, whereby when one of said portable electronic funds data recording mediums is removed from said reader before completing a transaction, said acceptor can update said monetary amount at a later time while being able to handle further purchase transactions using different said mediums in the interim.

26. An electronic funds acceptor system for use with at least one vending machine, comprising:

a plurality of portable electronic funds data recording mediums each containing an identification number;

an electronic reader associated with said at least one vending machine for reading data from said recording medium;

means for controlling a purchase transaction using said medium and for maintaining a count of total product purchase in a memory record for each said medium including said identification number;

means for transferring said count of total product purchase for said mediums identified by said identification number from said at least one vending machine to an accounting computer; and said accounting computer comprising means for determining a total amount of product purchased from said at least one vending machine using each said recording medium identified by said identification number since the time of last billing to produce a billing amount for each said recording medium, wherein said means for controlling a purchase transaction comprises:

a memory for storing incomplete transaction records including an identification number for a predetermined said medium and associated electronic funds data;

means for reading and storing an identification number from said medium;

means for determining whether said identification number read matches an identification number of said incomplete transaction records; and means for updating a monetary amount of electronic funds held by said medium based on said associated data and for updating said incomplete transaction records, if a match of said identification number is determined, whereby when one of said portable electronic funds data recording mediums is removed from said reader before completing a transaction, said acceptor can update said monetary amount at a later time while being able to handle further purchase transactions using different said mediums in the interim.

27. The system as claimed in claim 26, wherein said count of total product purchased is reset to zero after being transferred to said transfer means.

28. The system as claimed in claim 26, wherein said count of total product purchased is a running balance of total product purchased using said medium, said recording mediums including read/write memory for storing said running balance and said reader being able to write data to said recording mediums.

29. The system as claimed in claim 28, wherein said means for controlling a purchase transaction deny said purchase transaction if said count of total product purchased recorded in said record for said identification number is greater than said balance recorded on said recording medium.

30. The system as claimed in claim 26, wherein said recording mediums comprise means for recording an incrementable use marker, further comprising:

a memory for storing an incrementable use marker associated with said identification number for each said medium used with said system;

means for reading and storing said marker from said medium;

means for determining whether said marker read from said medium follows said marker stored in said memory whereupon a pass signal is generated;

means for signaling a fraudulent said medium and preventing use of said medium in absence of said pass signal; and means for updating said marker in said incrementable use marker memory and on said medium.

* * * * *